(12) United States Patent
Mukai

(10) Patent No.: US 10,179,843 B2
(45) Date of Patent: Jan. 15, 2019

(54) METHOD FOR PRODUCING TIRE MEMBER

(71) Applicant: TOYO TIRE & RUBBER CO., LTD., Itami-shi, Hyogo (JP)

(72) Inventor: Tsunetaka Mukai, Itami (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 0 days.

(21) Appl. No.: 15/717,157

(22) Filed: Sep. 27, 2017

(65) Prior Publication Data

US 2018/0105652 A1 Apr. 19, 2018

(30) Foreign Application Priority Data

Oct. 14, 2016 (JP) .................. 2016-202812

(51) Int. Cl.
*C08J 3/22* (2006.01)
*C08K 13/02* (2006.01)

(52) U.S. Cl.
CPC .............. *C08J 3/22* (2013.01); *C08K 13/02* (2013.01); *C08J 2307/02* (2013.01)

(58) Field of Classification Search
CPC .................... C08J 3/22; C08K 13/02
See application file for complete search history.

(56) References Cited

U.S. PATENT DOCUMENTS

| | | | |
|---|---|---|---|
| 2014/0124113 A1 | 5/2014 | Miyazaki et al. | |
| 2014/0128531 A1 | 5/2014 | Miyazaki et al. | |
| 2014/0128532 A1* | 5/2014 | Nakamura ............... | C08K 3/04 524/496 |

FOREIGN PATENT DOCUMENTS

| | | |
|---|---|---|
| JP | 2014-95014 A | 5/2014 |
| JP | 2014-95016 A | 5/2014 |

* cited by examiner

*Primary Examiner* — Edward J Cain
(74) *Attorney, Agent, or Firm* — Westerman, Hattori, Daniels & Adrian, LLP

(57) ABSTRACT

Provided is a method for producing a tire member that can give a vulcanized rubber high in fatigue resistance. The method includes: (i) mixing carbon black, a dispersing solvent and a rubber latex solution with each other to produce a rubber latex solution including the carbon black; (ii) solidifying the resultant rubber latex solution including the carbon black to produce a rubber solidified product including the carbon black; (iii) adding, to the resultant rubber solidified product including the carbon black, a compound represented by the following formula (I):

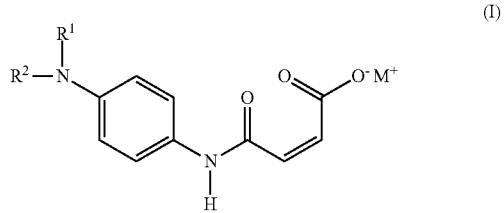

(I)

and dispersing the compound represented by the formula (I) into the rubber solidified product including the carbon black, this product containing water, while dehydrating the rubber solidified product including the carbon black to produce a wet rubber masterbatch; and (iv) adding, to the resultant wet rubber masterbatch, silica and a silane coupling agent, and dry-mixing these substances with each other.

4 Claims, No Drawings

METHOD FOR PRODUCING TIRE MEMBER

BACKGROUND OF THE INVENTION

Field of the Invention

The present invention relates to a method for producing a tire member yielded using at least carbon black, a dispersing solvent and a rubber latex solution as raw materials.

Description of the Related Art

In the rubber industry, it has been hitherto known that at the time of producing a rubber composition including carbon black, a wet rubber masterbatch is used to improve the composition in workability and carbon-black-dispersing performance. This masterbatch-used process is a process of mixing carbon black and a dispersing solvent beforehand with each other at a predetermined ratio, and dispersing the carbon black into the dispersing solvent by mechanical force to prepare a carbon-black-including slurry solution; mixing this slurry solution with a rubber latex solution in a liquid phase; adding thereto a solidifier such as an acid to yield a solidified product; and then collecting and drying the solidified product.

The use of the wet rubber masterbatch can give a rubber composition better in carbon-black-dispersing performance and rubber properties such as workability and reinforceability than the use of a dry rubber masterbatch yielded by mixing carbon black with a rubber in a solid phase. The use of such a rubber composition as a raw material makes it possible to produce, for example, a pneumatic tire decreased in rolling resistance and excellent in fatigue resistance, or such a rubber product.

As a rubber composition in which a dry rubber masterbatch is used, known is a composition including a specific compound having, at its terminal, a nitrogen functional group and a carbon-carbon double bond (Patent Documents 1 and 2).

Patent Documents 1 and 2 each state that in the specific compound, the terminated functional group reacts with a carboxyl group or some other functional group that is present on the surface of carbon black so that this compound can be bonded to the carbon black, and further the carbon-carbon double bond moiety undergoes a reaction with radicals of a polymer or a reaction which follows sulfur cross-linkage, so that the specific compound can be bonded to the polymer. The documents state that this matter can improve the carbon black in dispersibility in the rubber composition.

Patent Documents 1 and 2 each describe a method for producing a dry rubber masterbatch, which includes the step of adding carbon black, rubber, the above-mentioned specific compound, silica, a silane coupling agent, and others simultaneously to a mixer, and then mixing these components with each other in a solid phase (or dry-mixing the components).

PRIOR ART DOCUMENTS

Patent Documents

Patent Document 1: JP-A-2014-95014
Patent Document 2: JP-A-2014-95016

In the meantime, as rubber products (vulcanized rubbers), particularly, tread rubbers for tires for heavy load that are yielded using a rubber composition as a raw material, the market requires rubber products or rubbers higher in fatigue resistance. However, respective vulcanized rubbers yielded from rubber compositions as described in the above-mentioned patent documents do not satisfy this property.

The inventors have made eager investigations to find out that: a reason for the matter described just above is in that at the time of adding rubber, which is a raw material of a dry rubber masterbatch, the above-mentioned specific compound, silica and a silane coupling agent simultaneously to a mixer, and then dry-mixing these components with each other, the mixture unfavorably rises in viscosity so that the resultant rubber composition unfavorably contains aggregated lumps of the raw materials; thus, the finally obtained vulcanized rubber cannot exhibit a sufficient fatigue resistance.

SUMMARY OF THE INVENTION

In the light of the above-mentioned actual situation, the present invention has been made. An object thereof is to provide a method for producing a tire member that can give a vulcanized rubber high in fatigue resistance.

Accordingly, the present invention is a method for producing a tire member yielded using at least carbon black, a dispersing solvent and a rubber latex solution as raw materials, which includes: a step (i) of mixing the carbon black, the dispersing solvent and the rubber latex solution with each other to produce a rubber latex solution including the carbon black; a step (ii) of solidifying the resultant rubber latex solution including the carbon black to produce a rubber solidified product including the carbon black; a step (iii) of adding, to the resultant rubber solidified product including the carbon black, a compound represented by the following formula (I):

[Formula 1]

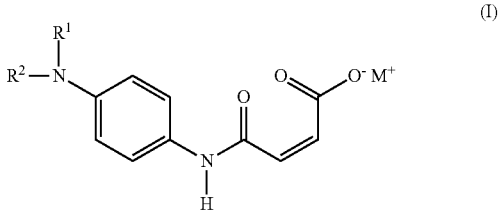

wherein $R^1$ and $R^2$ may be the same or different from each other, and each represent a hydrogen atom, or an alkyl group, alkenyl group or alkynyl group that has 1 to 20 carbon atoms, and $M^+$ represents a sodium ion, potassium ion or lithium ion; and dispersing the compound represented by the formula (I) into the rubber solidified product including the carbon black, this product containing water, while dehydrating the rubber solidified product including the carbon black to produce a wet rubber masterbatch; and a step (iv) of adding, to the resultant wet rubber masterbatch, silica and a silane coupling agent, and dry-mixing these substances with each other.

According to this producing method, in the step (iii), the compound represented by the formula (I) is dispersed into the water-containing rubber solidified product including the carbon black while the rubber solidified product including the carbon black is dehydrated. Generally, a rubber used for tires shows hydrophobicity in a dry state. In the meantime, the compound represented by the formula (I) shows hydrophilicity. Thus, even when a dry-state rubber is dry-mixed with the compound represented by the formula (I), the dispersibility of the compound represented by the formula (I) in the rubber is not easily improved. However, according to the present producing method, in the step (iii) corresponding to a dehydrating step, the compound represented by the formula (I) is dispersed into the water-containing rubber solidified product including the carbon black. It is presumed that this dispersing manner makes a dramatic improvement of the compound represented by the formula (I) in dispersibility in the solidifying product by aid of water. As a result, the compound represented by the formula (I) can be dispersed at a high level in the rubber solidified product including the carbon black.

Once the compound represented by the formula (I) is dispersed in the rubber solidified product including the carbon black, the dispersibility of the compound represented by the formula (I) is kept even when this rubber solidified product including the carbon is dehydrated, so that also in the finally obtained wet rubber masterbatch or tire member, which is obtained by drying the product, the dispersibility of the compound represented by the formula (I) is dramatically improved. Thus, about a vulcanized rubber obtained from the tire member yield according to the producing method, the carbon black included in the vulcanized rubber is also improved in dispersibility. Accordingly, the vulcanized rubber is better in fatigue resistance than vulcanized rubbers yielded using a dry rubber masterbatch.

According to the producing method, in the step (iv), silica and a si lane coupling agent are added to the wet rubber masterbatch yielded in the step (iii), and these substances are dry-mixed with each other. It is presumed that the carbon black included in the wet rubber masterbatch has a high dispersibility in the rubber, and is further covered with the compound represented by the formula (I). Accordingly, even when in the step (iv) the silica and the silane coupling agent are added to the wet rubber masterbatch, the mixed product does not easily rise in viscosity.

DETAILED DESCRIPTION OF THE PREFERRED EMBODIMENTS

In a method according to the present invention for producing a tire member, at least carbon black, a dispersing solvent, and a rubber latex solution are used as raw materials.

The species of the carbon black may be any carbon black species used in an ordinary rubbery industry, such as SAF, ISAF, HAF, FEF or GPF, or may be an electroconductive carbon black species such as acetylene black or ketjen black. The form of the carbon black species may be a granulated carbon black species, which has been granulated, considering the handleability thereof in an ordinary rubbery industry; or may be a non-granulated carbon black species. Such carbon black species may be used singly or in any combination of two or more thereof.

About the carbon black, the nitrogen adsorption specific surface area is preferably from 15 to 150 $m^2/g$ to make the resultant vulcanized rubber excellent in exothermic property and viscosity keeping performance. About the carbon black, particularly, as one out of raw materials used for a tread rubber for tires for heavy loads, the nitrogen adsorption specific surface area is preferably from 80 to 150 $m^2/g$. The carbon black content is preferably from 30 to 80 parts by weight, more preferably from 40 to 70 parts by weight for 100 parts by weight of the rubber component included in the tire member.

The dispersing solvent is in particular preferably water, and may be, for example, water containing an organic solvent. Such dispersing solvents may be used singly or in any combination of two or more thereof.

The rubber latex solution may be a natural rubber latex solution or a synthetic rubber latex solution.

The natural rubber latex solution is a natural product obtained by metabolic effect of a plant. Particularly preferred is a natural-rubber/water system latex solution in which a dispersing solvent is water. The number-average molecular weight of the natural rubber in the natural rubber latex solution is preferably 2,000,000 or more, more preferably 2,500,000 or more. About the natural rubber latex solution, concentrated latex, fresh latex named field latex, and other latexes are usable without being distinguished from each other. The synthetic rubber latex solution is, for example, a latex solution of styrene-butadiene rubber, butadiene rubber, nitrile rubber or chloroprene rubber produced by emulsion polymerization. Such rubber latex solutions may be singly or in any combination of two or more thereof.

The present invention is characterized in that when at least the carbon black, the dispersing solvent and the rubber latex solution are used as raw materials to yield a rubber solidified product including the carbon black and then this product is dehydrated, a compound represented by the following formula (I) is added to the rubber solidified product including the carbon black:

[Formula 2]

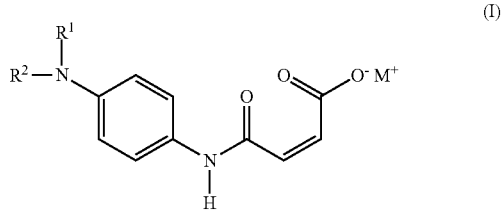

wherein $R^1$ and $R^2$ may be the same or different from each other, and each represent a hydrogen atom, or an alkyl group, alkenyl group or alkynyl group that has 1 to 20 carbon atoms, and M represents a sodium ion, potassium ion or lithium ion.

In order to heighten the compound in affinity with the carbon black, it is especially preferred to use a compound represented by the following formula (I'), in which $R^1$ and $R^2$ in the formula (I) are hydrogen atoms, and $M^+$ therein is a sodium ion:

[Formula 3]

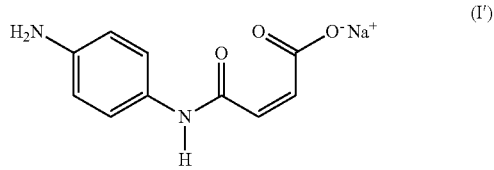

The following will specifically describe a method according to the present invention for producing a tire member. This producing method is a method for producing a tire member yielded using at least carbon black, a dispersing solvent and a rubber latex solution as raw materials, the method including a step (i) of mixing the carbon black, the dispersing solvent and the rubber latex solution with each other to produce a rubber latex solution including the carbon black, a step (ii) of solidifying the resultant rubber latex solution including the carbon black to produce a rubber solidified product including the carbon black; and a step (iii) of adding, to the rubber solidified product including the carbon black, a compound represented by the formula (I), and dispersing this compound represented by the formula (I) in the rubber solidified product including the carbon black, this product containing water, while dehydrating the rubber solidified product including the carbon black to produce a wet rubber masterbatch; and a step (iv) of adding silica and a silane coupling agent to the resultant wet rubber masterbatch, and dry-mixing these substances with each other.

<Step (i)>

The step (i) in the present invention is a step of mixing carbon black, a dispersing solvent and a rubber latex solution with each other to produce a rubber latex solution including the carbon black. In the present invention, it is especially preferred that the step (i) includes a step (i-(a)) of dispersing the carbon black into the dispersing solvent, and adding, at the time of the dispersing, at least one partial amount of the rubber latex solution to the dispersing solvent to produce a slurry solution including the carbon black to which particles of the rubber latex adhere, and a step (i-(b)) of mixing the slurry solution including the carbon black, to which the rubber latex particles adhere, with the rest of the rubber latex solution to produce a rubber latex solution including the carbon black, to which the rubber latex particles adhere. Hereinafter, the steps (i-(a)) and (i-(b)) will be described.

<Step (i-(a))>

The step (i-(a)) in the present invention is a step of dispersing carbon black into a dispersing solvent, and adding, at the time of the dispersing, at least one partial amount of a rubber latex solution to the dispersing solvent to produce a slurry solution including the carbon black to which particles of the rubber latex adhere. It is allowable to mix the rubber latex solution beforehand with the dispersing solvent, and subsequently add the carbon black into the resultant mixture to disperse the carbon black therein; or to add the carbon black to the dispersing solvent, and next dispersing the carbon black in the dispersing solvent while adding the rubber latex solution into the resultant dispersion at a predetermined adding speed. Alternatively, it is allowable to add the carbon black into the dispersing solvent, and next add a predetermined divided volume of the rubber latex solution several times into the carbon-black-added dispersing solvent while dispersing the carbon black in the dispersing solvent. By dispersing the carbon black into the dispersing solvent in the presence of the rubber latex solution, the slurry solution including the carbon black can be produced, in which the rubber latex particles adhere to the carbon black. The addition amount of the rubber latex solution in the step (i-(a)) is, for example, from 0.075 to 12% by weight of the whole of the rubber latex solution to be used (the whole thereof to be added in the steps (i-(a)) and (i-(b)).

In the step (i-(a)), the rubber solid content in the rubber latex solution to be added is preferably from 0.25 to 15%, more preferably from 0.5 to 6% by weight of the carbon black. The concentration of the rubber solid in the rubber latex solution to be added is preferably from 0.2 to 5% by weight, more preferably from 0.25 to 1.5% by weight. In these cases, a wet rubber masterbatch can be produced in which the dispersion degree of the carbon black is heightened while the rubber latex particles are surely caused to adhere to the carbon black.

In the step (i-(a)), the method for mixing the carbon black with the dispersing solvent in the presence of the rubber latex solution may be a method of dispersing the carbon black, using an ordinary dispersing machine such as a highly shearing mixer, a High Shear Mixer, a homo-mixer, a ball mill, a bead mill, a high-pressure homogenizer, an ultrasonic homogenizer or a colloid mill.

The "highly shearing mixer" means a mixer having a high-speed-rotatable rotor and a fixed stator in which in the state of making a precise clearance between the rotor and the stator, the rotor is rotated to produce a highly shearing effect. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product. An example thereof is a mixer, "High Shear Mixer", manufactured by a company Silverson.

In the present invention, at the time of mixing the carbon black with the dispersing solvent in the presence of the rubber latex solution, thereby producing the slurry solution including the carbon black, to which the rubber latex particles adhere, a surfactant may be added thereto in order to improve the carbon black in dispersibility into the solution. The surfactant may be a surfactant known in the rubber industry. Examples thereof include nonionic surfactants, anionic surfactants, cationic surfactants, and amphoteric surfactants. Instead of the surfactant or in addition of the surfactant, an alcohol such as ethanol may be used. However, when the surfactant is used, it is feared that the finally obtained vulcanized rubber is lowered in rubber physical properties. Thus, the blend amount of the surfactant is preferably 2 parts or less by weight, more preferably 1 part or less by weight for 100 parts by weight of the rubber solid in the rubber latex solution. It is preferred not to use any surfactant substantially.

<Step (i-(b))>

The step (i-(b)) in the present invention is a step of mixing the slurry solution with the rest of the rubber latex solution to produce a rubber latex solution including the carbon black, to which the rubber latex particles adhere. The method for mixing the slurry solution with the rest of the rubber latex solution in a liquid phase is not particularly limited, and may be a method of mixing the slurry solution with the rest of the rubber latex solution, using an ordinary dispersing machine such as a highly shearing mixer, a High Shear Mixer, a homo-mixer, a ball mill, a bead mill, a high-pressure homogenizer, an ultrasonic homogenizer or a colloid mill. As required, the whole of the dispersing machine or some other mixing system may be heated at the time of the mixing.

When the dehydrating period and labor in the next step (iii) are considered, it is preferred that the rest of the rubber latex solution is higher in rubber solid concentration than the rubber latex solution added in the step (i-(a)). Specifically, the rubber solid concentration is preferably from 10 to 60% by weight, more preferably from 20 to 30% by weight.

<(2) Step (ii)>

The step (ii) in the present invention is a step of solidifying the rubber latex solution including the carbon black to produce a rubber solidified product including the carbon black. The method for the solidifying may be a method of incorporating a solidifier into the rubber latex solution including the carbon black, to which the rubber latex particles adhere. In this case, the solidifier may be a substance used ordinarily to solidify a rubber latex solution, for example, an acid such as formic acid or sulfuric acid, or a salt such as sodium chloride. It is allowable as the need arises that the present method has, after the step (ii) and before the step (iii), a solid-liquid-separating step such as a centrifugal separation step or a heating step in order to decrease appropriately water contained in the rubber solidified product including the carbon black.

<(3) Step (iii)>

The step (iii) in the present invention is a step of dehydrating the rubber solidified product including the carbon black to produce a wet rubber masterbatch. In the step (iii), using, for example, a monoaxial extruder, the rubber solidified product including the carbon black is heated to a temperature of 100 to 250° C., and simultaneously the product is dehydrated while shearing force is applied to the product. According to the present invention, in the step (iii), particularly, the compound represented by the formula (I) is added to the rubber solidified product including the carbon black to disperse the compound represented by the formula (I) in the water-containing rubber solidified product including the carbon black while dehydrating the rubber solidified product including the carbon black. Before the start of the step (iii), the water content in the rubber solidified product including the carbon black is not particularly limited. It is preferred to incorporate, e.g., the above-mentioned solid-liquid-separating step into the method of the present invention, as the need arises, and then adjust the water content to set the Wa/Wb ratio, which will be detailed just below, into an appropriate range.

As described above, by dispersing the compound represented by the formula (I) into the rubber solidified product including the carbon black in the presence of water, the dispersibility of the compound represented by the formula (I) is remarkably improved. When the compound represented by the formula (I) is added to the rubber solidified product including the carbon black, the water amount (Wa) of this product is, for example, preferably 1 part or more by weight, more preferably 10 parts or more by weight for 100 parts by weight of the rubber component in the rubber solidified product, and is preferably 800 parts or less by weight, more preferably 600 parts or less by weight therefor. When the compound represented by the formula (I) is added to the rubber solidified product, the contained amount (Wb) of the compound represented by the formula (I) is, for example, preferably 0.1 part or more by weight, more preferably 0.5 part or more by weight for 100 parts by weight of the rubber component in the rubber solidified product, and is preferably 10 parts or less by weight, more preferably 5 parts or less by weight therefor. Furthermore, about the ratio of Wa to Wb (Wa/Wb ratio), it is preferred to satisfy the following expression: $1 \leq Wa/Wb \leq 8100$. If the Wa/Wb ratio is less than one, the compound represented by the formula (I) may not be sufficiently improved in dispersibility in the rubber solidified product including the carbon black. In order to improve the compound represented by the formula (I) further in the dispersibility, the Wa/Wb ratio is preferably one or more. In the meantime, if the Wa/Wb ratio is more than 8100, water to be dehydrated is remarkably large in quantity so that the productivity of wet rubber masterbatches tends to be deteriorated. When the productivity of wet rubber masterbatches is considered, the Wa/Wb ratio is preferably 7400 or less.

In order to decrease the water content by percentage further in the wet rubber masterbatch, a drying step may be separately incorporated, as the need arises after the step (iii), into the method of the present invention. The method for drying the tire member may be a method using a drying machine that may be of various types, such as a monoaxial extruder, an oven, a vacuum drier, or an air drier.

<(4) Step (iv)>

The step (iv) in the present invention is a step of adding silica and a silane coupling agent to the wet rubber masterbatch, and dry-mixing these substances with each other to produce a tire member.

The species of the silica is not particularly limited as far as the species is a silica species usable as a reinforcing filler. The species is preferably wet silica (hydrated silicic acid). The colloidal property of the silica is not particularly limited, either. The nitrogen adsorption specific surface area (BET) thereof is preferably from 150 to 250 $m^2/g$, more preferably from 180 to 230 m/g, the area being according to the BET method. The BET of the silica is measured according to the BET method which is described in ISO 5794. Such silica species may be used singly or in any combination of two or more thereof.

The silica content is preferably from 0.5 to 40 parts by weight for 100 parts by weight of the rubber component included in the tire member. In order to improve the vulcanized rubber in fatigue resistance, the silica content is preferably 1 part or more by weight, more preferably 1.5 parts or more by weight for 100 parts by weight of the rubber component included in the tire member. In order to restrain the tire member from rising in viscosity, the silica content is preferably 35 parts or less by weight, more preferably 30 parts or less by weight for 100 parts by weight of the rubber component included in the tire member.

The silane coupling agent may be any silane coupling agent used ordinarily for rubbers. Examples thereof include sulfide silanes such as bis(3-triethoxysilylpropyl) tetrasulfide, bis(3-triethoxysilylpropyl) disulfide, bis(2-triethoxysilylethyl) tetrasulfide, bis(4-triethoxysilylbutyl) disulfide, bis (3-trimethoxysilylpropyl) tetrasulfide, and bis(2-trimethoxysilylethyl) disulfide; mercaptosilanes such as 3-mercaptopropyltrimethoxysilane, 3-mercaptopropyltriethoxysilane, 3-mercaptopropylmethyldimethoxysilane, 3-mercaptopropyldimethylmethoxysilane, and mercaptoethyltriethoxysilane; and protected mercaptosilanes such as 3-octanoylthio-1-propyltriethoxysilane, and 3-propionylthiopropyltrimethoxysilane. Such silane coupling agents may be used singly or in any combination of two or more thereof.

In order to cause advantageous effects of the silica addition to be sufficiently exhibited, the content of the silane coupling agent is preferably 2% or more by weight, more preferably 4% or more by weight of the silica. The content is preferably 20% or less by weight, more preferably 15% or less by weight thereof.

In order to restrain the tire member from rising in viscosity, and improve the vulcanized rubber in fatigue resistance, the step (iv) may include a step (iv-(a)) of adding the carbon black and the compound represented by the formula (I) to the resultant wet rubber masterbatch, and dry-mixing these substances with each other to produce a mixed product, and a step (iv-(b)) of adding the silica and the silane coupling agent to the resultant mixed product, and dry-mixing these substances with each other. By rendering the step (iv) these steps, a bound rubber produced by the carbon black and the compound represented by the formula (I), and a bound rubber produced by the silica and the silane coupling agent can be mixed with each other in different steps. Thus, the mixed product does not easily undergo insufficient mixing based on a rapid rise in the viscosity thereof, and the mixed product can be restrained from rising in viscosity.

In the step (iv), various blending agents are further usable. The usable blending agents may be blending agents used ordinarily in the rubber industry. Examples thereof include a sulfur-containing vulcanizer, a vulcanization promoter, an antiaging agent, zinc oxide, amethylene receptor and a methylene donor, stearic acid, a vulcanization promotion aid, a vulcanization retarder, an organic peroxide, softeners such as wax and oil, and a working aid.

The species of sulfur in the sulfur-containing vulcanizer may be of any ordinary sulfur species for rubbers. Examples thereof include powdery sulfur, precipitated sulfur, insoluble sulfur, and highly dispersible sulfur. Sulfur-containing vulcanizers each containing such a sulfur species may be used singly or in any combination of two or more thereof.

The sulfur content is preferably from 0.3 to 6.5 parts by weight for 100 parts by weight of the rubber component included in the tire member. If the sulfur content is less than 0.3 part by weight, the vulcanized rubber is short in crosslinkage density to be lowered in rubber strength and others. If the content is more than 6.5 parts by weight, the vulcanized rubber is deteriorated, particularly, in both of heat resistance and durability. In order to keep the rubber strength of the vulcanized rubber good certainly and improve the rubber further in heat resistance and durability, the sulfur content is more preferably in the range of 1.0 to 5.5 parts by weight for 100 parts by weight of the rubber component included in the tire member.

The vulcanization promoter may be a vulcanization promoter usable ordinarily for vulcanizing rubbers. Examples thereof include sulfenamide type, thiuram type, thiazole type, thiourea type, guanidine type, and dithiocarbamic acid salt type vulcanization promoters. Such vulcanization promoters may be used singly or in any combination of two or more thereof.

The vulcanization promoter content is preferably from 1 to 5 parts by weight for 100 parts by weight of the rubber component included in the tire member.

The antiaging agent may be an antiaging agent usable ordinarily for rubbers, examples thereof including aromatic amine type, amine-ketone type, monophenolic type, bisphenolic type, polyphenolic type, dithiocarbamic acid salt type, and thiourea type antiaging agents. Such antiaging agents may be used singly or in any combination of two or more thereof.

The antiaging agent content is preferably from 1 to 5 parts by weight for 100 parts by weight of the rubber component included in the tire member.

The step (iv) may make use of a rubber for adjusting the content of the rubber component included in the tire member. The rubber may be a diene rubber known by those skilled in the art. Examples of the rubber include natural rubber (NR), polyisoprene rubber (IR), polystyrene butadiene rubber (SBR), polybutadiene rubber (BR), chloroprene rubber (CR), and nitrile rubber (NBR).

In the step (iv), the method for blending the individual raw materials (individual components) with each other is not particularly limited, and the method is, for example, a method of adding, into a kneading machine, components other than vulcanization-related components, such as the sulfur-containing vulcanizer and the vulcanization promoter, in any order, and then kneading the added components; a method of adding the other components thereto simultaneously, and then kneading the added components; or a method of adding the entire components thereto, and then kneading the components. In order to prevent the mixed product from rising in viscosity, it is preferred to blend the carbon black and the compound represented by the formula (I) in a kneading step different from a kneading step of blending the silica and the silane coupling agent, these different steps being, for example, the step (iv-(a)), and the step (iv-(b)).

The method for the above-mentioned dry-mixing may be a method using a mixing machine used in an ordinary rubber industry, such as a Bunbury mixer, a kneader or a roll, to attain the mixing. The number of times of the mixing may be one or more. The period for the mixing may be varied in accordance with the size of the used mixing machine and others, and may be usually from about 2 to 5 minutes. When the tire member includes none of the vulcanization-related components, the outlet temperature of the mixing machine is set into a range preferably from 120 to 170° C., more preferably from 120 to 150° C. When the tire member includes the vulcanization-related components, the outlet temperature of the mixing machine is set into a range preferably from 80 to 110° C., more preferably from 80 to 100° C.

In the present invention, a tire member can be produced through the following process instead of the steps (i) to (iii): a process of adding, to a mixture of carbon black and a rubber, the compound represented by the formula (I) and water (in an amount of about 1 to 10 parts by weight for 100 parts by weight of the rubber component) to yield a wet rubber masterbatch in which the compound represented by the formula (I) is dispersed; and subsequently using, in the step (iv), the rubber masterbatch yielded in this way instead of the above-mentioned wet rubber masterbatch. This producing method makes it possible to heighten the compound represented by the formula (I) high in dispersibility in the wet rubber masterbatch produced at an intermediate stage of the production of a tire member. Thus, the tire member, which is yielded from this wet rubber masterbatch, is excellent in dispersing performance of the compound represented by the formula (I).

The species of the carbon black described just above may be the same as used in the above-mentioned method for producing a wet rubber masterbatch. The rubber may be a diene rubber known by those skilled in the art. Examples of the rubber include natural rubber (NR), polyisoprene rubber (IR), polystyrene butadiene rubber (SBR), polybutadiene rubber (BR), chloroprene rubber (CR), and nitrile rubber (NBR).

A vulcanized rubber obtained from a tire member produced according to the method of the present invention has a high fatigue resistance to be suitable as a tread rubber for tires for heavy load.

EXAMPLES

Hereinafter, the present invention will be described by way of working examples thereof. However, the invention is never limited by the examples.

(Used Materials)
a) Carbon black:
  Carbon black "N234" (nitrogen adsorption specific surface area: 126 $m^2/g$): "SEAST 7HM" (manufactured by Tokai Carbon Co., Ltd.);
b) Dispersing solvent: Water;
c) Rubber latex solution:
  Natural rubber latex solution "NR field latex" (manufactured by a company Golden Hope)(DRC=31.2%);
d) Compound represented by the formula (I):
  Sodium (2Z)-4-[(4-aminophenyl)amino]-4-oxo-2-butenoate (manufactured by Sumitomo Chemical Co., Ltd.);

e) Solidifier: Formic acid (solution obtained by diluting a first-class 85% solution thereof into a 10% solution to adjust the pH of the diluted solution to 1.2) (manufactured by Nacalai Tesque, Inc.);

f) Silica: "NIPSIL AQ" (BET=205 m²/g) (manufactured by Nippon Silica Industrial Co., Ltd.)

g) Silane coupling agent: Bis(3-triethoxysilylpropyl) disulfide "Si75" (manufactured by Degussa AG);

h) Zinc flower: "Zinc flower No. 3" (manufactured by Mitsui Mining & Smelting Co., Ltd.);

i) Stearic acid: "RUNACK S-20" (manufactured by Kao Corp.);

j) Sulfur: "5% Oil-put finely powdery sulfur" (manufactured by Tsurumi Chemical Industry Co., Ltd.);

k) Vulcanization promoters:

(A) N-cyclohexyl-2-benzothiazole sulfenamide "SANCELER CM" (manufactured by Sanshin Chemical Industry Co., Ltd.), and (B) 1,3-Diphenylguanidine "NOCCELER D" (manufactured by Ouchi Shinko Chemical Industrial Co., Ltd.);

l) Natural rubber (NR): "RSS #3"; and m) Polybutadiene: "BR150B" (manufactured by Ube Industries, Ltd.).

Example 1

The above-specified carbon black was added into a natural rubber diluted latex solution in water that had a concentration adjusted into 0.52% by weight, so as to have blend amounts shown in Table 1 (the carbon black concentration in water was 5% by weight). A machine ROBOMIX manufactured by Primix Corp. was used (ROBOMIX conditions: a rotation number of 9000 rpm, and a use period of 30 minutes) to disperse the carbon black into the solution to produce a slurry solution including the carbon black, shown in Table 1, in which natural rubber latex particles adhered to the carbon black (step (i)-(a)). Next, the above-specified natural rubber latex solution (28% by weight) was added to the carbon-black-including slurry solution produced in the step (i)-(a), in which the natural rubber latex particles adhered to the carbon black, to have blend amounts shown in Table 1. Next, a mixer for household use, SM-L56 model, manufactured by Sanyo Electric Co. Ltd. was used (mixer conditions: a rotation number of 11300 rpm, and a use period of 30 minutes) to mix the latex solution and the slurry solution with each other to produce a rubber latex solution including the carbon black, to which the natural rubber latex particles adhered (step (i)).

Formic acid as a solidifier was added to the natural rubber latex solution produced in the step (i) and including the carbon black, to which the natural rubber latex particles adhered, to change the pH of the whole of the solution to 4. In this way, a natural rubber solidified product including the carbon black was produced (step (ii)). The resultant natural rubber solidified product including the carbon black was optionally subjected to a solid-liquid separating step to adjust the water amount in the natural rubber solidified product including the carbon black to a water amount shown in Table 1. This natural rubber solidified product including the carbon black, and the compound represented by the formula (I) were charged into a screw press, V-01 model, manufactured by Suehiro EPM Corp. to disperse the compound represented by the formula (I) in the natural rubber solidified product including the carbon black while dehydrating the natural rubber solidified product including the carbon black. In this way, a wet rubber masterbatch was produced (step (iii)). In the step (iii), the Wa/Wb ratio value is shown in Table 1.

A Bunbury mixer was used to dry-mix the wet rubber masterbatch yielded as described above with individual raw materials described in an Example-1-column corresponding to the step-(iv)-column in Table 1 (mixing period: 3 minutes, and mixer discharge temperature: 150° C.) to produce a tire member (non-pro kneading step 1 in the step (iv)). Sulfur, and the vulcanization promoters (A) and (B) were added to the resultant tire member in respective amounts shown in Table 1, and then the Bunbury mixer was used to dry-mix these substances (mixing period: 1 minute, and mixer discharge temperature: 90° C.) to produce a non-vulcanized tire member (pro-kneading step in the step (iv)). The blend amount of each of the components shown in Table 1 is shown as a value of parts by weight (phr) of the component when the entire amount of the rubber component included in the tire member is regarded as 100 parts by weight.

Examples 2 to 4

In each of the examples, a non-vulcanized tire member was produced in the same way as in Example 1 except that the respective blend amounts of the silica and the silane coupling agent were changed as shown in Table 1.

Examples 5 and 6

In each of the examples, a wet rubber masterbatch was produced in the same way as in Example 1 except that in the steps (i) to (iii) in Example 1, the respective blend amounts of the carbon black, the compound represented by the formula (I) and water were changed as shown in Table 1. A Bunbury mixer was used to dry-mix the resultant wet rubber masterbatch with individual raw materials described in an Example-5-or-6-column corresponding to the step-(iv)-column in Table 1 (mixing period: 3 minutes; and mixer discharge temperature: 150° C.) to produce a mixed product (non-pro kneading step 1 in the step (iv)). The silica and the silane coupling agent were added to the resultant mixed product in respective amounts shown in Table 1, and the Bunbury mixer was used to dry-mix these substances with each other (mixing period: 3 minutes; and mixer discharge temperature: 150° C.) to produce a tire member (non-pro-kneading step 2 in the step (iv)). Furthermore, to the resultant tire member were added the sulfur and the vulcanization promoters (A) and (B) in respective amounts shown in Table 1. The Bunbury mixer was used to dry-mix these substances with each other (mixing period: 1 minute; and mixer discharge temperature: 90° C.) to produce a non-vulcanized tire member (pro-kneading step in the step (iv)).

Comparative Examples 1 and 2

In each of the examples, a Bunbury mixer was used to dry-mix individual raw materials shown in a Comparative-Example-1-or-2-column corresponding to the step-(iv)-column in Table 2 with each other (mixing period: 3 minutes, and mixer discharge temperature: 150° C.) to produce a tire member (non-pro-kneading step 1 in the step (iv)). Next, the sulfur, and the vulcanization promoters (A) and (B) were added to the resultant tire member in respective amounts shown in Table 2, and then the Bunbury mixer was used to dry-mix these substances with each other (mixing period: 1 minute, and mixer discharge temperature: 90° C.) to produce a non-vulcanized tire member (pro-kneading step in the step (iv)).

Comparative Example 3

A Bunbury mixer was used to dry-mix individual raw materials shown in a Comparative-Example-3-column corresponding to the step-(iv)-column in Table 2 with each other (mixing period: 3 minutes, and mixer discharge temperature: 150° C.) to produce a mixed product (non-pro-kneading step 1 in the step (iv)). The silica and the silane coupling agent were added to the resultant mixed product in respective amounts shown in Table 2, and then the Bunbury mixer was used to dry-mix these substances with each other (mixing period: 3 minutes, and mixer discharge temperature: 150° C.) to produce a tire member (non-pro-kneading step 2 in the step (iv)). Furthermore, the sulfur, and the vulcanization promoters (A) and (B) were added to the resultant tire member in respective amounts shown in Table 2, and then the Bunbury mixer was used to dry-mix these substances with each other (mixing period: 1 minute, and mixer discharge temperature: 90° C.) to produce a non-vulcanized tire member (pro-kneading step in the step (iv)).

Comparative Example 4

A non-vulcanized tire member was produced, using individual raw materials described in a Comparative-Example-4-column in Table 2 in the same way as in Example 1 except that in the step (iii) in Example 1, a wet rubber masterbatch was produced without adding any compound represented by the formula (I) to the other components.

Comparative Example 5

A non-vulcanized tire member was produced, using individual raw materials described in a Comparative-Example-5-column in Table 2 in the same way as in Example 1 except that before the step (iii) in Example 1, the natural rubber solidified product including the carbon black was dried until the water content in this solidified product turned to 0%, and the resultant natural rubber solidified product including the carbon black, which contained no water to be in a dry state, was used.

About the non-vulcanized tire member yielded in each of the above-mentioned working examples and the comparative examples, the viscosity thereof was evaluated as described below. Moreover, the non-vulcanized tire member yielded in each of the working examples and the comparative examples was vulcanized at 150° C. for 30 minutes to produce a vulcanized rubber. About the resultant vulcanized rubber, the fatigue resistance thereof was evaluated as described below. The evaluation results are shown in Tables 1 and 2.

<Viscosity Evaluation>

About the viscosity evaluation, in accordance with JIS K6300, a rotor-less Mooney viscometer manufactured by Toyo Seiki Co., Ltd. was used to pre-heat each of the non-vulcanized tire members at 100° C. for 1 minute, and measure the torque value thereof with a Mooney unit after 4 minutes from the end of the pre-heating. In each of Examples 1 to 5, and Comparative Examples 3 to 5, the measured value is shown as an index relative to a value of Comparative Example 1, which is regarded as 100. In Example 6, the measured value is shown as an index relative to a value of Comparative Example 2, which is regarded as 100. It is demonstrated that as the examples are smaller in index, the examples are lower in viscosity (Mooney viscosity) to be better in workability.

<Fatigue Resistance Evaluation>

The fatigue evaluation of each of the vulcanized rubbers was made at a temperature of 23° C. in accordance with flexural fatigue resistance evaluation in JIS K6260 (Demattia flex cracking test). The number of times of flexing of a test piece of the vulcanized rubber was counted until a crack in the test piece grew into a size of 2 mm. In each of Examples 1 to 5, and Comparative Examples 3 to 5, the measured value is shown as an index relative to a value of Comparative Example 1, which is regarded as 100. In Example 6, the measured value is shown as an index relative to a value of Comparative Example 2, which is regarded as 100. It is demonstrated that as the examples are smaller in index numeral value, the examples are better in fatigue resistance.

TABLE 1

|  |  |  |  | Example 1 | Example 2 | Example 3 | Example 4 | Example 5 | Example 6 |
|---|---|---|---|---|---|---|---|---|---|
| Wet rubber masterbatch production | Steps (i)-(iii) |  | Natural rubber (solid) | 100 | 100 | 100 | 100 | 100 | 70 |
|  |  |  | Carbon black | 50 | 50 | 50 | 50 | 25 | 25 |
|  |  |  | Compound (I) | 3 | 3 | 3 | 3 | 1.5 | 1.5 |
|  |  |  | Water | 200 | 200 | 200 | 200 | 200 | 100 |
|  |  |  | Wa/Wb | 67 | 67 | 67 | 67 | 134 | 67 |
| Tire member production | Step (iv) | Non-pro-kneading step 1 | Natural rubber |  |  |  |  |  |  |
|  |  |  | Polybutadiene |  |  |  |  |  | 30 |
|  |  |  | Carbon black |  |  |  |  | 25 | 25 |
|  |  |  | Compound 1 |  |  |  |  | 1.5 | 1.5 |
|  |  |  | Silica | 1 | 2 | 15 | 30 |  |  |
|  |  |  | Silane coupling agent | 0.1 | 0.2 | 1.5 | 3 |  |  |
|  |  |  | Zinc flower | 3 | 3 | 3 | 3 | 3 | 3 |
|  |  |  | Stearic acid | 2 | 2 | 2 | 2 | 2 | 2 |
|  |  | Non-pro-kneading step 2 | Silica |  |  |  |  | 15 | 15 |
|  |  |  | Silane coupling agent |  |  |  |  | 1.5 | 1.5 |
|  |  | Pro-kneading step | Sulfur | 2 | 2 | 2 | 2 | 2 | 2 |
|  |  |  | Vulcanization promoter (A) | 1.5 | 1.5 | 1.5 | 1.5 | 1.5 | 1.5 |
|  |  |  | Vulcanization promoter (B) | 0.5 | 0.5 | 0.5 | 0.5 | 0.5 | 0.5 |
|  | Evaluations |  | Viscosity | 90 | 95 | 103 | 110 | 94 | 92 |
|  |  |  | Fatigue resistance | 91 | 89 | 85 | 81 | 85 | 80 |

TABLE 2

|  |  |  | Comparative Example 1 | Comparative Example 2 | Comparative Example 3 | Comparative Example 4 | Comparative Example 5 |
|---|---|---|---|---|---|---|---|
| Wet rubber masterbatch production | Steps (i)-(iii) | Natural rubber (solid) |  |  |  | 100 | 100 |
|  |  | Carbon black |  |  |  | 50 | 50 |
|  |  | Compound 1 |  |  |  | 0 | 3 |
|  |  | Water |  |  |  | 200 | 0 |
|  |  | Wa/Wb |  |  |  | — | 0 |
| Tire member production | Step (iv) Non-pro-kneading step 1 | Natural rubber | 100 | 70 | 100 |  |  |
|  |  | Polybutadiene |  | 30 |  |  |  |
|  |  | Carbon black | 50 | 50 | 50 |  |  |
|  |  | Compound (I) | 3 | 3 | 3 | 3 |  |
|  |  | Silica | 15 | 15 |  | 15 | 15 |
|  |  | Silane coupling agent | 1.5 | 1.5 |  | 1.5 | 1.5 |
|  |  | Zinc flower | 3 | 3 | 3 | 3 | 3 |
|  |  | Stearic acid | 2 | 2 | 2 | 2 | 2 |
|  | Non-pro-kneading step 2 | Silica |  |  | 15 |  |  |
|  |  | Silane coupling agent |  |  | 1.5 |  |  |
|  | Pro-kneading step | Sulfur | 2 | 2 | 2 | 2 | 2 |
|  |  | Vulcanization promoter (A) | 1.5 | 1.5 | 1.5 | 1.5 | 1.5 |
|  |  | Vulcanization promoter (B) | 0.5 | 0.5 | 0.5 | 0.5 | 0.5 |
| Evaluations |  | Viscosity | 100 | 100 | 110 | 108 | 105 |
|  |  | Fatigue resistance | 100 | 100 | 98 | 95 | 97 |

What is claimed is:

1. A method for producing a tire member yielded using at least carbon black, a dispersing solvent and a rubber latex solution as raw materials, which comprises:
    a step (i) of mixing the carbon black, the dispersing solvent and the rubber latex solution with each other to produce a rubber latex solution including the carbon black,
    a step (ii) of solidifying the resultant rubber latex solution including the carbon black to produce a rubber solidified product including the carbon black;
    a step (iii) of adding, to the resultant rubber solidified product including the carbon black, a compound represented by the following formula (I):

[Formula 1]

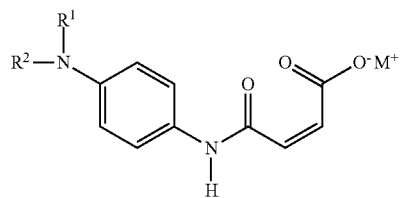

wherein $R^1$ and $R^2$ may be the same or different from each other, and each represent a hydrogen atom, or an alkyl group, alkenyl group or alkynyl group that has 1 to 20 carbon atoms, and $M^+$ represents a sodium ion, potassium ion or lithium ion; and dispersing the compound represented by the formula (I) into the rubber solidified product including the carbon black, this product containing water, while dehydrating the rubber solidified product including the carbon black to produce a wet rubber masterbatch; and
    a step (iv) of adding, to the resultant wet rubber masterbatch, silica and a silane coupling agent, and dry-mixing these substances with each other.

2. The method for producing a tire member according to claim 1, wherein in the step (iii), in the case of representing the water amount in the rubber solidified product including the carbon black at the time of the addition of the compound represented by the formula (I) by Wa, and representing the contained amount of the compound represented by the formula (I) by Wb, the following expression is satisfied: $1 \leq Wa/Wb \leq 8100$.

3. The method for producing a tire member according to claim 1, wherein the amount of the silica is from 0.5 to 40 parts by weight for 100 parts by weight of a rubber component comprised in the tire member.

4. The method for producing a tire member according to claim 2, wherein the amount of the silica is from 0.5 to 40 parts by weight for 100 parts by weight of a rubber component comprised in the tire member.

* * * * *